United States Patent [19]

Davis

[11] Patent Number: 4,845,926
[45] Date of Patent: Jul. 11, 1989

[54] POUCH PACKAGING MACHINE WITH INDEPENDENT SIDE AND CROSS SEALS

[75] Inventor: Steven D. Davis, Yuciapa, Calif.

[73] Assignee: W. A. Lane, Inc., San Bernardino, Calif.

[21] Appl. No.: 126,705

[22] Filed: Nov. 30, 1987

Related U.S. Application Data

[63] Continuation-in-part of Ser. No. 79,458, Jul. 30, 1987, Pat. No. 4,768,330, and a continuation-in-part of Ser. No. 79,344, Jul. 30, 1987, Pat. No. 4,769,974.

[51] Int. Cl.⁴ .................... B65B 9/02; B65B 9/20; B65B 51/14
[52] U.S. Cl. ...................... 53/451; 53/551; 53/554
[58] Field of Search ............... 53/451, 546, 551, 552, 53/554, 555

[56] References Cited

U.S. PATENT DOCUMENTS

| | | | |
|---|---|---|---|
| 2,419,982 | 5/1947 | Zwoyer | 53/554 X |
| 3,228,170 | 1/1966 | Eisenstadt | 53/554 |
| 3,451,187 | 6/1969 | Massey et al. | 53/546 X |
| 4,265,074 | 5/1981 | Reuter et al. | 53/551 |
| 4,557,103 | 12/1985 | Schwartz et al. | 53/554 X |
| 4,622,798 | 11/1986 | Oki | 53/551 X |

Primary Examiner—Horace M. Culver
Attorney, Agent, or Firm—Herb Boswell

[57] ABSTRACT

A form, fill and seal pouch packaging machine has independent side and cross seals. A first prime mover driving a first output linkage moves the side seals. A second prime mover driving a second output linkage moves the cross seals. The first and second prime movers are independent of each other and as such the side seals can be operated independently of the cross seal. Because the cross seal is independent of the side seals, pouches of any desired length can be formed, filled and sealed on the pouch packaging machine.

16 Claims, 4 Drawing Sheets

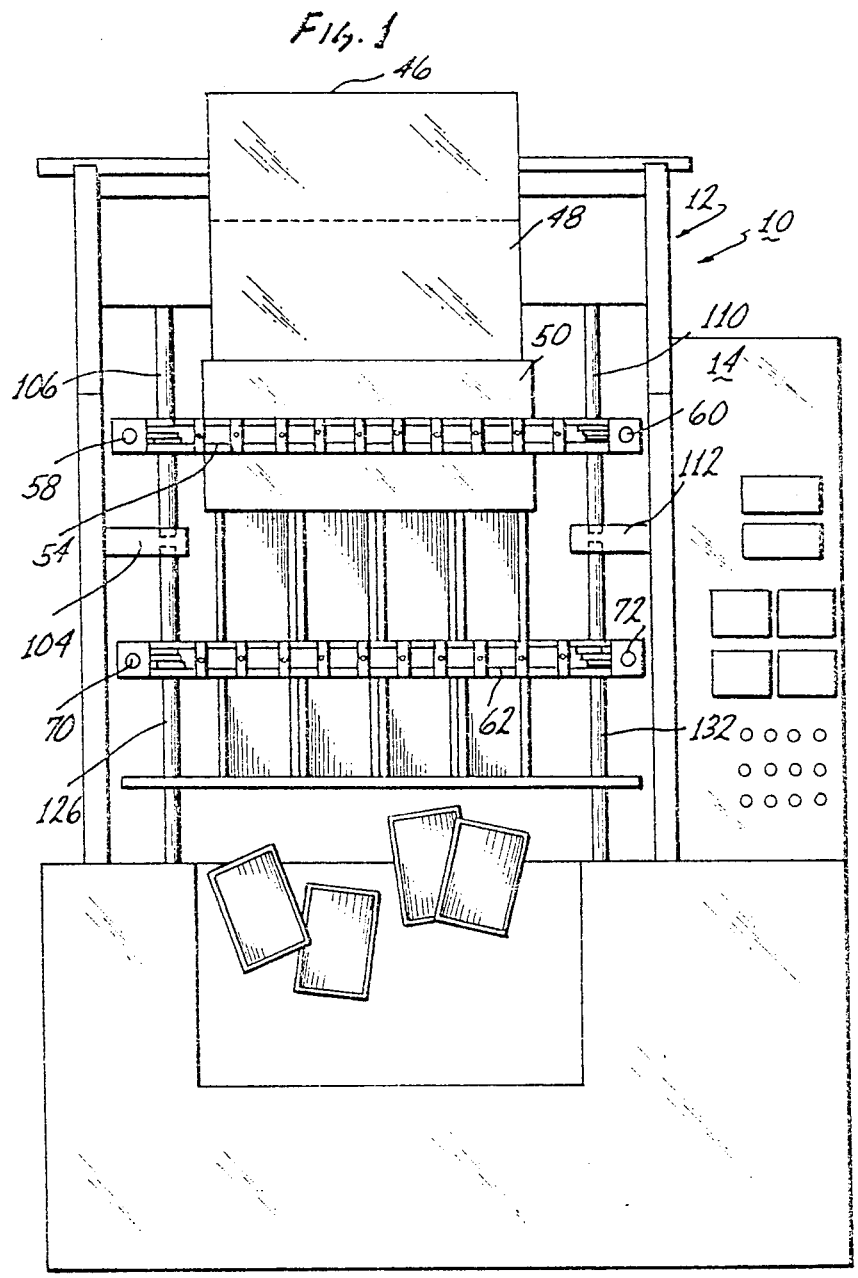

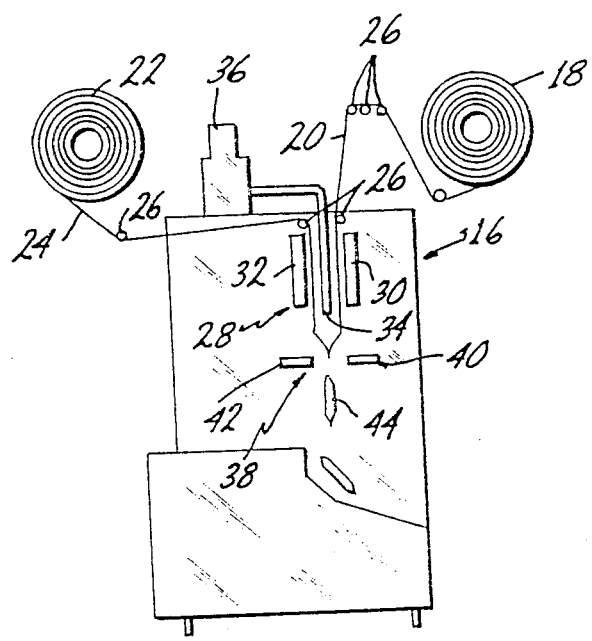

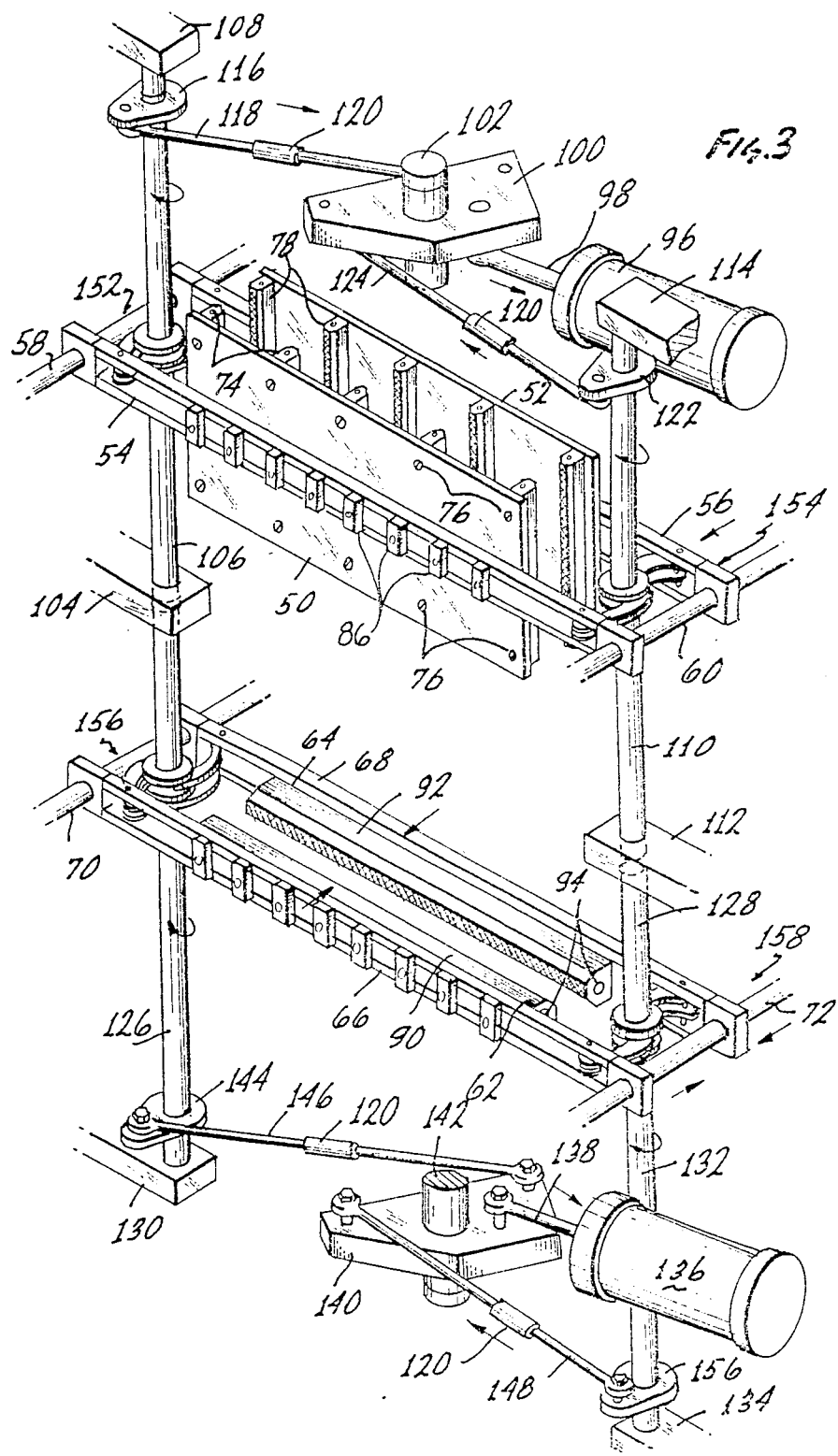

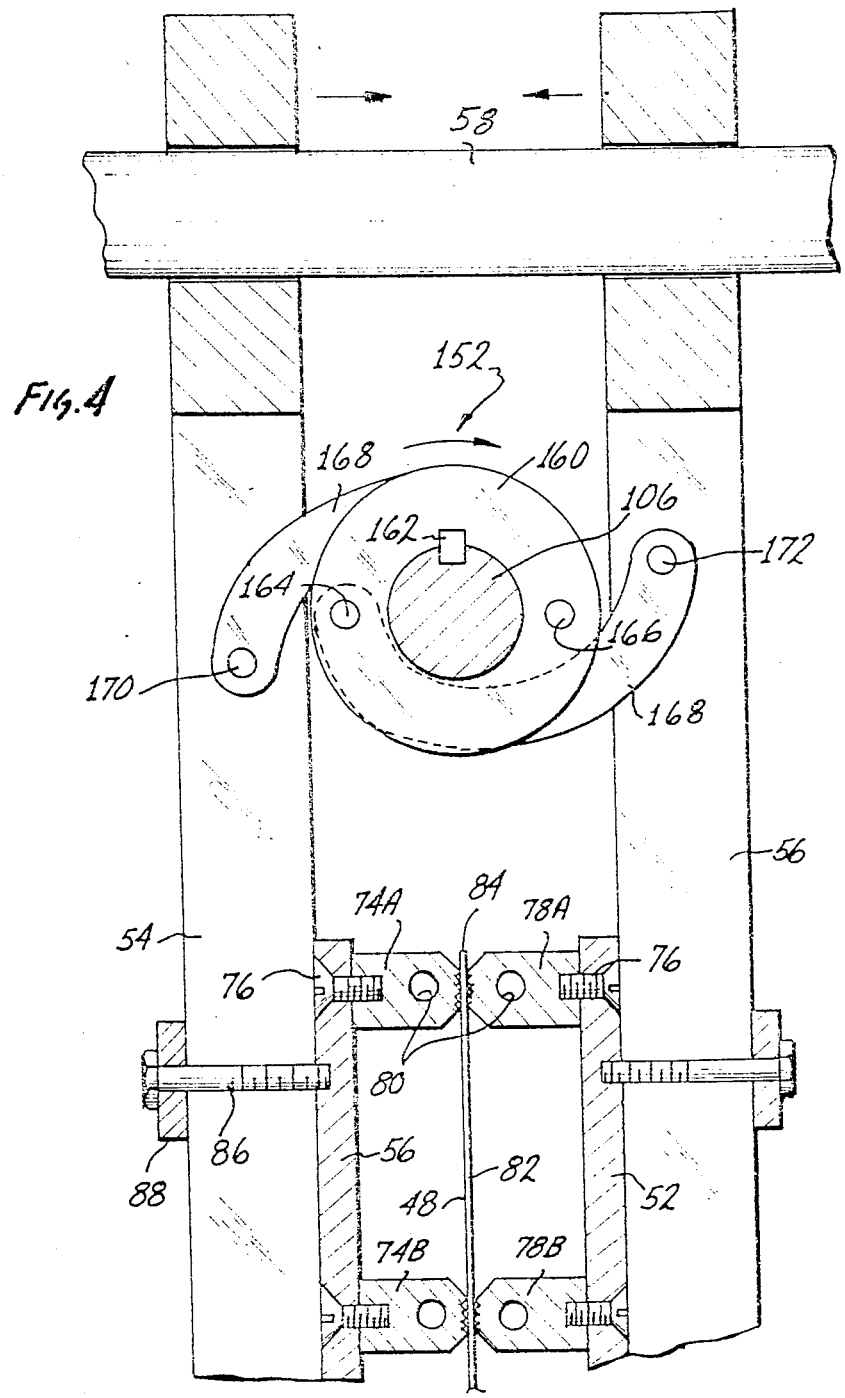

POUCH PACKAGING MACHINE WITH INDEPENDENT SIDE AND CROSS SEALS

CROSS REFERENCE TO RELATED APPLICATIONS

This application is a continuation in part of application Ser. No. 079,458, filed July 30, 1987 now U.S. Pat. No. 4,768,330 and entitled BAG GRIPPER AND SPREADER FOR FORM, FILL AND SEAL BAGGING MACHINE and application Ser. No. 079,344, filed July 30, 1987 now U.S. Pat. No. 4,769,974 and entitled PROCESS AND APPARATUS FOR GAS PURGING OF A BAG BEING FORMED, FILLED AND SEALED ON A BAGGING MACHINE, both of which are assigned to the same assignee as this application and the entire contents of both of which are herein incorporated by reference.

BACKGROUND OF INVENTION

This application is directed to an improved pouch packaging machine which has independently movable side and cross seals. Because the side and cross seals are independent from one another, bags of a variety of sizes can be produced on the machine and different stroke lengths and/or pressures can be used independently for the side seals and the cross seal.

In the pouch packaging industry the word "seal" has been utilized to refer to both hardware items and to actual seams formed on pouches. For the purposes of this specification the word seal, unless otherwise modified, will be made in reference to machine hardware.

Certain pouch packaging machines are known. They generally share certain common characteristics. Typically a pouch packaging machine will convey continuous rolls of front and back sealable films first through side seals to form side seams and then through a cross seal to form top and bottom seams on pouches which are being formed on the packaging machine. For an individual pouch the front and back sealable films are fed through the machine and side seams are formed by side seals. Next a bottom seam is formed by the cross seal and the pouch filled with its appropriate contents. The pouch is then completed by the formation of a top seam, also formed by the cross seal. The pouch is then severed from the moving streams of the front and back heat sealable film and is discharged from the machine.

Normally a number of pouches are made concurrently in parallel columns across the width of the machine. Thus, a plurality of side seals would be utilized to form a plurality of side seams between the front and back films as they move through the packaging machine. A cross seam is formed across the totality of the width of the plurality of parallel moving pouches. This cross seam forms the top seam on a lower pouch in each column and concurrently forms the bottom seam on the next adjacent pouch in each column. The seam formed by the cross seal is severed to separate the filled, completely formed pouch from the next adjacent empty pouch which is now in position for filling.

Each of the side seams is formed by a side seal which consists of a front and back side seal bar. The front and back side seal bars are brought together to compress and hat seal the front and back sealable film together to form the side seam. The individual side seal bars, both front and back, are of a sufficient length to form a continuous side seam along the totality of the length of a particular pouch being formed on the pouch packaging machine. To do this the front and back side seal bars must be brought together in a perfectly aligned parallel arrangement such that they exert an even pressure along the totality of their length.

Likewise the cross seal is formed by front and back cross seal bars which are brought together to squeeze the front and back heat sealable films together to form a continuous cross seal across the totality of the width of the moving columns of pouches being formed on the pouch packaging machine. As with the side seals, the pressure across the totality of the width of the cross seals must be even such that a perfect seal is formed across the totality of the front and back films.

In known pouch packaging machines the side seals and the cross seals are driven by a single prime mover such that they move in unison. As the front and back side seal bars are brought together to form side seams the front and back cross seal bars are brought together to form the top and bottom seams. In operating the pouch packaging machine, the front and back films are advanced and then they are concurrently contacted by both the side seals and the cross seal. Next the individual pouches are filled. The cycle starts over again and once again the film is advanced and the side seals and cross seals again contact the front and back films to squeeze these films together to form the seals between them.

For small pouches utilized for condiments, salad dressing and other similar food stuff the above described operation is very effective and efficient and upwards of a hundred cycles can be performed each minute. Thus on a machine, as for instance, a machine utilizing 18 inch wide film forming one and one half inch wide packaging, 12 side by side columns of individual pouches can be formed concurrently. This machine is thus capable of forming, filling and sealing well over 1,000 pouches per minute.

Since it is necessary to bring the front and back side seal bars together evenly along the totality of their length to form a perfect side seam, the length of the side seal bars has heretofore been limited. Further, since the cross seal has moved in conjunction with the side seals, the size of the packages or pouches which can be formed on a typical pouch packaging machine has also been limited. Formation of larger size pouches has been inhibited by the length of the package. It has only been possible to increase the size of the pouches by increasing the width of the pouch in order to gain additional volume in the pouch. This too has its limitations.

Since continuous rolls of film are only available in certain widths with the maximum width presently available being about 24 inches, maximum pouch size has been limited to about 64 ounces. However, additional problems are encountered when very wide pouches are made because of the spreading of the front and back film surfaces away from one another during and just after the filling operation.

The final size of any pouch formed on a pouch packaging machine is determined by the amount of contents to be held in the pouch and how the contents will be disbursed from the pouch. Thus, the geometry of the pouch is sometimes highly dependent upon what the pouch will ultimately contain. Normally since pouches are somewhat elongated to facilitate dispensing of the contents thereof, the side seams will be of a greater overall dimension than the top and bottom seams resulting in the overall square surface area of the totality of the front and back side seal bars over which sealing pressure is applied being greater than that of the front and back cross seal bars.

In prior known pouching machines which are all driven by a single prime mover, since the overall area of the side seal bars is greater than the overall area of the cross seal bars, or vice versa, the pressure exerted on the side seal bars against the heat sealable films will be less (or more) than that exerted by the cross seal bars. This leads to different seal characteristics of the front and back heat sealable films along the side seams as opposed to the top and bottom seams. Since the specifications of the weakest seam must be considered, heretofore certain trade offs would have to be made to insure that the weakest seam was of sufficient strength yet the pressure exerted on the other seam or seams, whether it be the cross seam or the side seams, was not overly excessive as to detract from the characteristics of the heat sealable films and the seams formed therein.

Furthermore, since the side seals and the cross seals moved in unison and were driven by a single prime mover, unless very sophisticated mechanical linkages were resorted to, in moving toward and away from one another the front and back side seal bars had to move the same distance as the front and back cross seal bars. While in small flat pouches this does not present too great a problem, in larger pouches which tend to have bulging contents, it is necessary to move the cross seal bar a sufficient distance to allow the filled pouch to descend through the cross seal bar prior to forming the top seam on the filled pouch. The side seal bars however are located upstream from the filling station and there is no reason for them to have to move the same distance as the cross seal bars since they only have to account for the thickness of the unfilled pouches, i.e. the thickness of the flat front and back films. Thus, heretofore to accommodate the movement of the cross seals, there has been excessive movement of the side seals through distances much greater than is needed for the passage of the unfilled pouches between the side seals.

BRIEF DESCRIPTION OF THE INVENTION

In view of the above it is apparent that there is a need for new and improved pouch packaging machines having independent side and cross seals. It is therefore a broad object of this invention to provide such new and improved pouch packaging machines. It is a further object of this invention to provide for improved pouch packaging machines which, because of the engineering characteristics inherent therein, are efficient in operation and economical in production.

These and other objects are achieved in a form, fill and seal pouch packaging machine which includes a first moving means located on a housing for producing a first mechanical output and a second moving means located on the housing for producing a second output. A side seal means for forming side seals on packages formed on the machine is located on the housing in operative association with the first moving means and is moved by the first moving means. Additionally a cross seal means for forming cross seals on pouches formed on the machine is located on the housing in operative association with the second moving means and is moved by the second moving means. The movement of the cross seal means is independent of the movement of the side seal means allowing for variable size pouches to be formed or variable pressure to be exerted on the side seams versus the cross seams or variable stroke length of the side seal means in comparison to the cross seal means.

The first moving means can include a first prime mover and a first output linkage with the first prime mover imparting mechanical motion to the first output linkage and with the first output linkage in turn operatively connecting to the side seal means to move the side seal means in response to movement of the first output linkage. Further, the second moving means can include a second prime mover and a second output linkage with the second prime mover imparting mechanical movement to the second output linkage and in turn the second output linkage connected to and moving the side seal means.

The side seal means can include front and back side seal bars operatively associated with one another and movable on the housing to move toward and away from one another in response to motion imparted to them by the first moving means. Likewise the cross seal means can include front and back cross seal bars operatively associated with one another and movably located on the housing to move towards and away from one another in response to motion imparted to them by the second moving means.

The side seal bars can be operatively associated with the first output linkage to move on the housing towards and away from one another in response to motion imparted to them by the first output linkage. The cross seal bars can be operatively associated with one another and with the second output linkage to move on the housing towards and away from one another in response to motion imparted to them by the second output linkage.

The motion imparted to the front and back side seal bars by the first output linkage will move the front and back side seal bars through a first length of travel and the motion imparted to the front and back cross seal bars by the second output linkage will move the front and back cross seal bars through a second length of travel wherein the second length of travel can be the same as or different than the first length of travel and the motion imparted to the front and back side seal bars through the first output means can be capable of forcing the front and back side seal bars against sealable films with a first force and the motion imparted to the front and back cross seal bars through the second output linkage can be capable of forcing the front and back cross seal bars against sealable films with a second force wherein the second force can be the same as or different from the first force.

Further, the objects of the invention are achieved in a process of forming a succession of individual pouches on a form, fill and seal pouch packaging machine which comprises the steps of first locating a front continuous roll of a sealable film on the machine and also locating a back continuous roll of a sealable film on the machine. Further, front and back side seal bars are located in operative association with a first moving means wherein the side seal bars are moved towards and away from one another in response to movement imparted to them by the first moving means. Additionally, front and back cross seal bars are located in operative association with a second moving means wherein the cross seal bars are moved towards and away from one another in response to movement imparted to them by the second moving means. The first and second moving means are then operated in one of an independent mode or a unison mode wherein in the independent mode the first moving means moves the side seal bars independent of the second moving means moving the cross seal bars and in the unison mode the first moving means moves the side seal bars in unison with the second moving means moving the cross seal bars. The front and the back continuous rolls of sealable film are moved past the front and back side seal bars and the first moving means is operated to move the side seal bars such that they contact the sealable films forming at least first and second continuous side seals between the front and back films. Further, the front and the back continuous rolls of film having the side seals thereon are moved past the front and back cross seal bars and the second moving means is operated to move the front and back cross seal bars such that they contact the front and back rolls of sealable film to form cross seals in the film.

The first and second moving means can be operated in the independent mode wherein for each individual pouch formed on the pouch packaging machine the side seal bars contact the sealable film at least once when the cross seal bars are not in contact with the sealable film or the cross seal bars contact the sealable film at least once when the side seal bars are not in contact with the sealable film. Alternately, the first and second moving means can be operated in the unison mode wherein the side seal bars contact the sealable films at the same time as the cross seal bars contact the sealable films.

The process can also include the side seal bars contacting the sealable films with a first force and the cross seal bars contacting the sealable films with a second force where the first force can be the same as or different from the second force. Additionally, the front and the back side seal bars can be moved by the first moving means towards and away from one another through a first distance of travel and the front and the back cross seal bars can be moved by the second moving means towards and away from one another through a second distance of travel wherein the first and the second distance of travel can be the same or can be different.

BRIEF DESCRIPTION OF THE DRAWINGS

This invention will be better understood when taken in conjunction with the figures wherein:

FIG. 1 is a front elevational view of a typical pouch packaging machine which utilizes this invention thereon;

FIG. 2 is a side elevational schematic representation view illustrating the operation of the pouch packaging machine of FIG. 1;

FIG. 3 is an isometric view of certain of the working components of the pouch packaging machine of FIG. 1; and FIG. 4 is a fragmentary top plan view in partial section of certain of the components as seen in FIG. 3.

This invention utilizes certain principles and/or concepts as set forth in the claims appended hereto. Those skilled in the mechanical and packaging arts will realize that these principles and/or concepts are capable of being utilized in a variety of embodiments which may differ from the exact embodiment utilized for illustrative purposes herein. For this reason this invention is not to be construed as being limited solely to the illustrative embodiments but should only be construed in view of the claims.

DETAILED DESCRIPTION OF THE INVENTION

FIG. 1 illustrates a pouch packaging machine 10 on which independently movable side and cross seals of the invention are utilized. The machine 10 includes a housing 12 having a control unit 14 located thereon. The control unit 14 includes appropriate microprocessor, electrical and hydraulic controls (not separately shown or identified) located therein which do not form a portion of this invention. For the purposes of this specification the control unit 14 will be capable of controlling a pressurized fluid supply to two hydraulic cylinders hereinafter identified. This control will activate these cylinders either in unison or independently. Typically the pressurized fluid will be pressurized air which is controlled utilizing control solenoids. The solenoids in turn are under microprocessor control.

Prior to describing further details of the machine 10 shown in FIG. 1 or fragments thereof shown in FIGS. 3 and 4, reference is made to FIG. 2 which shows a schematic representation of a pouch packaging machine.

In FIG. 2 a pouch packaging machine 16 has a front roll 18 of heat sealable film 20. Further, it includes a rear roll 22 of heat sealable film 24. The film 20 and 24 are passed from the rolls 18 and 22 over appropriate rollers collectively identified by the numeral 26 such that they are positioned adjacent to one another at the top of the machine 16.

The films 20 and 24 pass between side seals generally depicted by the numeral 28. These are formed from front side seal bars 30 and rear side seal bars 32. The front and rear side seal bars 30 and 32 are brought together squeezing the films 20 and 24 between them to heat seal these films to form side seals or side seams between the films. Depending upon the number of sealing bars 30 and 32 utilized on the machine 16 one or more vertically oriented tubes are formed between the films 20 and 24. If several side by side pouches are being formed on the machine 16, appropriate cutters, not separately numbered or identified, are associated with the side seals 28 to sever these side seams into individual tubes.

A filling tube 34 leads from a product reservoir 36 to a location within the tubes, i.e. to a location within the partically formed pouches. Located below the filling tube 34 is a cross seal generally depicted by the numeral 38. The cross seal is formed from a front cross seal bar 40 and a rear cross seal bar 42. These come together to form a cross seam between the films 20 and 24. As is seen in FIG. 2 a bottom cross seam has been formed between the films 20 and 24 such that when product is ejected from the reservoir 36 via the filling tube 34 into the partically formed pouches, the partially formed pouch are loaded with this product.

Concurrently with forming the bottom seam on the partially formed pouch which is located in association with the filling tube 34, the top cross seam is formed on the pouch 44 which is positioned just below the cross seal 38. The pouch 44 is severed from the advancing films 20 and 24 and descends out of the machine 16. The films 20 and 24 are then advanced such that after it is filled, a next pouch is located below the cross seal 38 and a further partially formed pouch is now located in association with the filling tube 34.

Continuous operation of the machine 16 produces a plurality of pouches 44 each filled with product. As described above, in prior known pouch packaging machines the side seals 28 and the cross seal 38 move in unison such that concurrently the cross seal was formed in conjunction with formation of the side seals.

Referring once again to FIG. 1 for the pouch packaging machine 10, as is seen in FIG. 1 a front film roll 46 is located on the housing 12 and dispenses the front film 48 downwardly on the machine 10. In a like manner a rear roll of film, not separately shown or identified in FIG. 1, would be located directly behind the front roll 46 of the film 48.

The front film 48 and a hereinafter identified rear film pass between side seal platens, front side seal platen 50 seen in both FIGS. 1 and 3 and rear side seal platen 52 see in FIG. 3. The front side seal platen 50 is attached to a front side slide bar 54 and the rear side seal platen 52 is attached to a rear side slide bar 56. The front and rear side slide bars 54 and 56 in turn slide back and forth on left upper axle 58 and right upper axle 60. The axles 58 and 60 are appropriately mounted on the housing 12 of the pouch packaging machine 10.

In a like manner a front cross seal platen 62 and a rear cross seal platen 64 are attached to front cross slide bars 66 and rear cross slide bars 68. These in turn are mounted on left lower axle 70 and right lower axle 72. The left and right lower axles 70 and 72 in turn are mounted on the housing 12 of the pouch packaging machine 10.

A plurality of front side seal bars collectively identified by the numeral 74 are attached to the front side seal platen 50 by appropriate counter sunk hex head screws collectively identified by the numeral 76. In a like manner a plurality of rear side seal bars collectively identified by the numeral 78 are attached to the rear side seal platen 52 by similar screws not separately identified or numbered.

The side seal bars 74 and 78 each include a cavity collectively identified by the numeral 80 in FIG. 4 in which is inserted a resistance heating element (not separately shown or identified). The resistance heating element is used in a known manner to heat the side seal bars 74 and 78 to assist in heat sealing the front film 48 to a rear film shown in FIG. 4 by the numeral 82. Thus, a typical side seam or side seal shown by the numeral 84 in FIG. 4 would be formed between the front and rear films.

As can be seen in FIGS. 1, 3 and 4 the front side seal platen 50 is fixedly held to the front side slide bar 54 by a plurality of bolts collectively identified by the numeral 86 which pass through cross pieces collectively identified by the numeral 88 on the slide bar 54 and thread into the front side seal platen 50. This securely holds the platen 50 to the slide bar 54 such that the platen 50 and the seal bars 74 attached thereto move in conjunction with movement of the slide bar 54.

In a like manner the rear side seal platen 52 would be attached to the rear side slide bar 56 and the front and rear cross seal platens 62 and 64 would be attached to the front and rear cross slide bars 66 and 68.

A front cross seal bar 90 is attached to the front cross seal platen 62 and a rear cross seal bar 92 is attached to the rear cross seal platen 64 also utilizing appropriate counter sunk hex head bolts identical to the bolts 76 described above. As with the side seal bars 74 and 80, the cross seal bars 90 and 92 would include an appropriate cavity collectively identified by the numeral 94 allowing for location of resistance heaters within the cross seal bars 90 and 92 for heating these bars to assist in effecting cross seals.

As is evident from FIG. 3, for the pouch packaging machine 10 illustrated therein, there are 5 sets of side seal bars 74 and 78 and only one set of cross seal bars 90 and 92. Further, the side seal bars 74 and 78 are elongated and as such their total surface area wherein they contacted the films 48 and 82 would be sufficiently more than the total contact surface area of the cross seal bars 90 and 92 against this film.

Heretofore in prior known pouch packaging machines compromises would have to be made such that neither the side seal bars nor the cross seal bars contacted the film with optimum pressure for forming a heat seal therein but one contacted the film with greater pressure and the other contacted the film with lesser pressure. However, as will be evident below because the side seal bars 70 and 74 of the pouch packaging machine 10 move independently from the cross seal bars 90 and 92 it is possible for both sets of these bars to contact the heat sealable film with optimum contact pressure for the particular film utilized.

As is seen in FIG. 3 a first hydraulic cylinder 96 serves as a first prime mover. Its internal piston, not separately shown or identified, is connected to an output shaft 98 which attaches to a bell crank 100. The bell crank 100 is appropriately pivoted via an axle 102 which is mounted on the housing 12. The bell crank 100 is rotated about the axle 102 by the hydraulic cylinder 96. The hydraulic cylinder 96 in turn is controlled via the control unit 14. Alternatively to a hydraulic cylinder 96, an appropriate solenoid or other equivalent device could be utilized as a first prime mover.

A left bearing block 104 serves as a lower bearing wherein a shaft 106 is journalled. The upper end of the shaft 106 is journalled in a further bearing block 108. This allows for rotation of the shaft 106 on the housing 12. In a like manner upper right shaft 110 is journalled in bearing block 112 at its lower end and bearing block 114 at its upper end. Cam member 116 is fixed to the upper left shaft 106 such that rotation of the cam member 116 is transferred to the shaft 106. A telescoping connecting rod 118 connects between the cam member 116 and the bell crank 100. The rod 118 includes first and second ends not separately identified or numbered which screw into central collar 120 allowing for the length of the rod 118 to be adjustable within certain limits. The cam member 116 serves as a bell crank to rotate the shaft 106 in response to rotation of the bell crank 100 via the connecting rod 118.

In a like manner cam member 122 is fixed to shaft 110 and is connected to bell crank 100 via connecting rod 124. Connecting rod 124 also includes a collar 120 allowing for minor adjustment of its length.

In response to activation of the hydraulic cylinder 96, preferredly an air activated hydraulic cylinder, bell crank 100 rotates and in turn it rotates the shaft 106 and 110. Because of the orientation of the cam members 116 and 122 and their attachment to the bell crank 100, movement of the shaft 98 into the cylinder 96 will result in clockwise movement of the shaft 110 and counterclockwise movement of the shaft 106. Conversely outward movement of the shaft 98 wherein it elongates from the cylinder 96 will result in counterclockwise movement of the shaft 110 and clockwise movement of the shaft 106. Since the shafts 106 and 110 move in opposite directions, irrespective of the direction of rotation of the bell crank 100 on the shaft 102 any torque developed in moving these components and other components attached thereto is cancelled. This eliminates vibration and facilitate rapid cycling of the pouch machine 10.

In a like manner as with that described for the side seals above, associated with the cross seal is a left lower shaft 126 and a right lower shaft 128. The shaft 126 is appropriately journalled at its upper end in bearing block 104 and at its lower end in bearing block 130. A right lower shaft 132 is journalled at its upper end in bearing block 112 and at its lower end in bearing block 134. The bearing blocks 104, 108, 112, 114, 130 and 134 are all appropriately mounted to the housing 12 of the pouch packaging machine 10. A further hydraulic cylinder 136 serves as a second prime mover. It is attached via shaft 138 to a bell crank 140. Bell crank 140 is pivoted on an axle 142 which is also mounted on the housing 12. A cam member 144 is fixed to the shaft 126 and is connected to the bell crank 140 via connecting rod 146 which also includes a collar 120. As such the connecting rod 146 is adjustable with respect to its length within the limits of the collar 120. A further connecting rod 148 also having an adjusting collar 120 connects a cam member 150 to the bell crank 140. Cam member 150 is fixed to the shaft 132.

As with the upper shafts 106 and 110, the lower shafts 126 and 132 rotate in opposite directions in response to their activation by the cylinder 136. This then cancels any torque associated with movement of the cross seal.

The left upper shaft 106 is coaxial with the left lower shaft 126 and the right upper shaft 110 is coaxial with the right lower shaft 132. All of the shafts 106, 110, 126 and 132 lie in a plane. This same plane extends centrally down between the side seal and the cross seal such that pouches formed on the pouch packaging machine 10 are also centralized on this plane as they move through the machine 10.

Motion is transferred from the first prime mover or hydraulic cylinder 96 to the side seals via the shafts 106 and 110. Motion is transferred from the second prime mover or hydraulic cylinder 136 to the cross seal via the shafts 126 and 132. Motion from the shafts 106 and 110 to the side seals is via cam toggle members 152 and 154 and motion from the shafts 126 and 132 to the cross seal is via cam toggle members 156 and 158. The cam toggle members 152, 154, 156 and 158 are of identical construction except that the cam toggle members 154 and 158 are rotated 180° with respect to the cam toggle members 154 and 156. Since each of the cam toggle members are of identical construction, for illustrative purposes the construction of only one of them, cam toggle member 152, will be described.

Cam toggle member 152 includes three rings collectively identified by the numeral 160 which are keyed to the shaft 106 via a key 162. The rings 160 are spaced apart from one another and are connected together by axles 164 and 166. The rings 160 rotate in conjunction with the shaft 106 because of the key 162 and this in turn rotates the axles 164 and 166.

Four connecting arms collectively identified by the numeral 168, two on either side, connect between the axles 164 and 166 and further axles 170 and 172 which are attached to front side slide bar 54 and the rear side slide bar 56 respectively. The connecting members 168 are pivotally attached to the axles 164, 166, 170 and 172.

As is seen in FIG. 4 if the shaft 106 is rotated counterclockwise this rotates the axles 164 and 166 counterclockwise. The connecting members 168 are formed as arcuate shaped members. Upon counterclockwise rotation of the rings 160, the connecting members 168 transfer motion such that the axles 170 and 172 are moved away from each other which in turn moves the front and rear side slide members 54 and 56 along the left upper axle 58. Thus in FIG. 4 upon counterclockwise rotation of the shaft 106, the front slide member 54 would move to the left and the rear side slide member 56 would move to the right.

When the axle 106 as seen in FIG. 4 has rotated counterclockwise 180° from the position as seen in FIG. 4 such that the key 162 would be positioned downwardly instead of upwardly as seen in the figure, the arms 168 would be extended at their maximum from the rings 160 and this in turn would extend side slide members 54 and 56 away from each other their maximum distance.

Now upon clockwise rotation of the shaft 106 the axles 64 and 66 rotates clockwise and this in turn is transferred to the connecting members 168. This pulls the connecting members 168 inwardly wrapping them around the axle 106 such that they return to the position as seen in FIG. 4. In doing so they slide the front and rear side slide members 54 and 56 toward one another along the left upper axle 58. This in turn brings the platens 50 and 52 toward one another which in turn brings the side seal bars 74 and 78 toward one another until they contact the film 48 and 82 squeezing it between them to form a side seal or side seam in this film.

The arc of the connecting members 168 is chosen such that as seen in FIG. 4, an imaginary line, as for instance a line connecting between the center of axle 164 to the center of axle 172, passes from one side of the center of axle 106 across the dead center of the axle 106 and to the other side (the side toward key 162) of the center of axle 106 just as the inside radius of the connecting members 168 contact the outer surface of the shaft 106. This toggles the connecting members 168 over center, i.e. over the dead center of shaft 106, to lock the side slide bars 54 and 56 in the position seen in FIG. 4 to fixedly hold the sealing bar 74 and 78 against one another with the film 48 and 82 trapped in between to form a proper side seal.

Since the cam toggle member 154 is upside down with respect to the cam toggle member 152, when the shaft 106 is rotated clockwise and the shaft 110 is rotated counterclockwise the cam toggle members 152 and 154 serve to pull the side slide bars 54 and 56 toward one another and when the shaft 106 is rotated counterclockwise and the shaft 110 is rotated clockwise they serve to push the side slide members 54 and 56 away from one another.

In a like manner the cam toggle members 156 and 158 serve to move the lower cross slide bars 66 and 68 toward and away from one another in response to activation of the hydraulic cylinder 136 which transfers motion via the shafts 126 and 132 to the cam toggle members 156 and 158.

The bell crank 100, the connecting rods 118 and 124, the cam members 116 and 122 and the shafts 106 and 110 form a first output linkage for the hydraulic cylinder 96 or first prime mover 96. In a similar manner the bell crank 140, the connecting rods 146 and 148, the cam members 144 and 150 and the shafts 126 and 132 form a second output linkage connected to the second prime mover 136 or hydraulic cylinder 136. As is evident motion of the first prime mover is independent from motion of the second prime mover and motion of the second output linkage is independent of the first output linkage and as such motion of the side seal bars is totally independent of motion of the cross seal bars.

The pressure exerted by the side seal bars can be made different from the pressure exerted by the cross seal bars by changing the pressure output from the first prime mover 96 compared to the second prime mover 136. This can be accomplished utilizing a number of common expedients such as feeding each cylinder 96 and 136 fluid at a different pressure or utilizing different sized pistons in the two different cylinder or the like.

In a like manner the stroke or limits of travel of the side seal can be made different and independent from the stroke or limits of travel of the cross seal. It is evident by making the cams 116 and 122 of a different size than the cams 144 and 150 or by shortening or lengthening the stroke of the shaft 98 with respect to the shaft 138 or by changing the pivot point of the connection of the shaft 98 on the bell crank 198 with respect to the pivot point of the connection of the shaft 138 on the bell crank 140 or by changing the lever arm of the connection of the shafts 118 and 124 to the bell crank 100 compared to the lever arm of the connection of the shafts 146 and 148 to the bell crank 140 the amount of travel of the side seal on the axles 58 and 60 can be made different than the cross seal on the axles 70 and 72.

Because of the above features normally since the side seal bars 74 and 78 would have a greater surface area than the cross seal bars 90 and 92, a greater amount of pressure or force can be generated by the first prime mover and when this is divided over the totality of the area of the side seal bar 74 and 78 it will be equal to a lesser amount of pressure generated by the second prime mover 136 when divided over the smaller surface area of the cross seals 90 and 92.

Depending on the packaging material being used on the machine 10 to form the pouches, optium sealing pressure can range for about 40 psi to about 200 psi. This optium pressure can be exerted independently by both the side seals and the cross seal even though they contact different surface area of sealable film.

In a similar manner for the machine 10 of the invention, movement of the side seals along the axles 58 and 60 can be much less than movement of the cross seals along the axles 70 and 72 to account for the fact that the side seal only has to move away from the film a slight amount. When the side seals or side seams are formed on a pouch, the pouch is empty. In reality, at the time of forming the side seals or side seams the pouch is nothing more than a flat pancake of the front and back films. This is opposed to the cross seal. In forming the cross seal or cross seam, i.e. the top and bottom pouch seams, the cross seal has to move away from the film an amount to account for the contents within the pouch which are spreading the film apart. By utilizing independently moving side seals and cross seal, with the machine 10, differential movement of the side seal and cross seal is possible.

The independent movement of the side seal with respect to the cross is particularly useful for the formation of large pouches. Indeed a pouch of any length can be formed by simply passing front and rear films through the pouch packaging machine 10 across the side seals until the ends of the film are between the cross seals and then forming a bottom seal on these pouches with the cross seal. The films are then continuously moved while continuously forming side seals and continuously filling the pouch while holding the cross seals in the open position. When a pouch of sufficient length has been formed the cross seal is then activated to seal the top of this pouch and concurrently form the bottom of a next pouch.

While pouches of tens even hundreds of feet in length would certainly would not be practical in the market place, if desired with the machine 10 pouches of any length could be formed. Normally, the pouch packaging machine 10 of the invention would be utilized to form pouches which are destined for commercial customers which utilize large volume pouches as for instances, pouches holding 5, 10, or even 25 gallons of cooking oil and the like. These pouches could be formed as long narrow pouches to facilitate handling, packaging and dispensing of their contents. This was heretofore unavailable in prior pouch packaging machines wherein the side seal moved in conjunction with the cross seal.

It is evident that by utilizing this invention, not only can the side seals be operated independent of the cross seal, but concurrently the pressure of the side seal can be made to be independent of the cross seal and concurrently with both of these, the stroke length or movement of the side seal can be made different than the stroke length or movement of the cross seal.

We claim:

1. A form, fill and seal pouch packaging machine which comprises:
   a housing;
   a first moving means for producing a mechanical output located on said housing;
   a second moving means for producing a further mechanical output located on said housing;
   a side seal means for forming side seals on pouches formed on said machine, said side seal means located on said housing in operative association with said first moving means and moved by said first moving means;
   cross seal means for forming cross seals on pouches formed on said machine, said cross seal means located on said housing in operative association with said second moving means and moved by said second moving means, said movement of said cross seal means independent of said movement of said side seal means;
   said first moving means includes a first prime mover and a first output linkage;
   said output linkage includes a first left shaft and a first right shaft, sad first left and first right shafts each independently mounted for rotation on said housing;
   said first prime mover imparting mechanical movement to said first output linkage rotating said first shafts;
   said side seal means operatively connecting to said first output linkage whereby said side seal means is moved in response to rotation of said first shafts;
   said second moving means includes a second prime mover and a second output linkage;
   said second output linkage includes a second left shaft and a second right shaft, said second left and second right shafts each independently mounted for rotation on said housing;
   said second prime mover imparting mechanical movement to said second output linkage rotating said second shafts; and
   said cross seal means operatively connecting to said second output linkage whereby said cross seal means is moved in response to rotation of said second shafts.

2. The machine of claim 1 wherein:

said side seal means includes front and back side seal bars operatively associated with one another and with said first output linkage, said side seal bars movably located on said housing to move towards and away from one another in response to motion imparted to them by way of rotation of said first shafts; and said cross seal means includes front and back cross seal bars operatively associated with one another and with said second output linkage, said cross seal bars movably located on said housing to move towards and away from one another in response to motion imparted to them by way of rotation of said second shafts.

3. The machine of claim 2 wherein:

said motion imparted to said front and back side seal bars by way of rotation of said first shafts moves said front and back side seal bars towards and away from each other through a first travel length; and said motion imparted to said front and back cross seal bars by way of rotation of said second shafts moves said front and back cross seal bars towards and away from each other through a second travel length and wherein said second travel length is different from said first travel length.

4. The machine of claim 2 wherein:

said motion imparted to said front and back side seal bars by said first prime mover by way of rotation of said first shafts is capable of forcing said front and back side seal bars against sealing films located between said front and back side seal bars with a first force; and said motion imparted to said front and back cross seal bars by said second prime mover by way of rotation of said second shafts is capable of forcing said front and back cross seal bars against sealing films located between said front and back cross seal bars with a second force and wherein said second force is different from said first force.

5. The machine of claim 1 wherein:

said first left and said first right shafts are located parallel to one another in a plane; and said second left and said second right shafts are located parallel to one another in said same plane.

6. The machine of claim 5 wherein:

said first left and said second left shafts are located coaxial with one another; and said first right and said second right shafts are located coaxial with one another.

7. The machine of claim 5 wherein:

said pouches are located essentially in said plane when both side seals and cross seals are formed on said pouches.

8. The machine of claim 1 wherein:

said first left and said first right shafts rotate in opposite direction to one another; and said second left and said second right shafts rotate in opposite direction to one another.

9. The machine of claim 8 wherein:

said first left and said second left shafts rotate in the same direction; and said first right and said second right shafts rotate in the same direction.

10. The machine of claim 1 wherein:

said movement imparted to said side seal means by said first prime mover and said first shafts moves said side seal means through a first travel length; and said movement imparted to said cross seal means by said second prime mover and said second shafts moves said cross seal means through a second travel length and wherein said second travel length is different from said first travel length.

11. The machine of claim 1 wherein:

said movement imparted to said side seal means by said first prime mover and said first shafts moves said side seal means with a first force; and said movement imparted to said cross seal means by said second prime mover and said second shafts moves said cross seal means with a second force and wherein said second force is different from said first force.

12. A process of forming a succession of individual pouches on a form, fill and seal pouch packaging machine of the type including front and back side seal bars in operative association with a first moving means whereby said side seal bars are moved towards and away from one another in response to movement imparted to them by said first moving means and front and back cross seal bars in operative association with a second moving means whereby said cross seal bars are moved towards and away from one another in response to movement imparted to them by said second moving means which comprises the steps of:

locating a front continuous roll of a sealable film on said machine;

locating a back continuous roll of a sealable film on said machine;

operating said first and second moving means in an independent mode wherein in said independent mode said first moving means said side seal bars independent of said second moving means moving said cross seal bars;

moving said front and said back continuous rolls of sealable film past said front and back side seal bars and operating said first moving means to move said side seal bars whereby said side seal bars contact said front and back rolls of sealable film to form at least first and second continuous side seals between said front and back films;

moving said front and said back continuous rolls of sealable film having said side seals thereon past said front and back cross seal bars and operating said second moving means to move said cross seal bars whereby said cross seal bars contact said front and back rolls of sealable film to form cross seals in said film; and operating said first and second moving means such that during the formation of each independent pouch either said side seal bars contact said sealable films at least once when said cross seal bars are not in contact with said sealable films or said cross seal bars contact said sealable films at least once when said side seal bars are not in contact with said sealable films.

13. The process of claim 12 including:

operating said first moving means whereby said front and said back side seal bars are moved by said first moving means towards and away from one another through a first travel distance; and operating said second moving means whereby said front and said back cross seal bars are moved by said second moving means towards and away from one another through a second travel distance and wherein said first and said second travel distances can be one of the same distance or different distances.

14. The process of claim 13 including:
   operating said first and second moving means whereby said travel distances of said side seal bars and said cross seal bars are different distances.

15. The process of claim 12 including:
   operating said first moving means whereby said second moving means move said front and back side seal bars against said front and back sealable films with a first force; and
   operating said second moving means whereby said second moving means move said front and back cross seal bars against said front and back sealable films with a second force wherein said first force is different from said second force.

16. A form, fill and seal pouch packaging machine which comprises:
   a housing;
   front and back side seal bars operatively associated with one another and movably located on said housing to move towards and away from one another;
   front and back cross seal bars operatively associated with one another and movably located on said housing to move towards and away from one another;
   a first prime mover;
   a second prime mover;
   a first output linkage operatively associated between said first prime mover and said front and back side seals for moving said side seals toward and away from one another, said first output linkage including a first set of initial linkage members, a first set of following linkage members and a first left rotating shaft and a first right rotating shaft, said first set of initial linkage members operatively associated between said first prime mover and said first left and right rotating shafts, said first set of following linkage members operatively associated between said front and back side seals and said first left and right rotating shafts, said first set of initial linking members and said first set of following linking members operatively associated with said first and second shafts at points distal from each other along the axis of said shafts; and
   a second output linkage operatively associated between said prime mover and said front and back cross seals for moving said cross seals toward and away from one another, said second output linkage including a second set of initial linkage members, a second set of following linkage members and a second left rotating shaft and a second right rotating shaft, said second set of initial linkage members operatively associated between said second prime mover and said second left and right rotating shafts, said second set of following linkage members operatively associated between said front and back cross seals and said second left and right rotating shafts, said second set of initial linking members and said second set of following linking members operatively associated with said second left and right shafts at points distal from each other along the axis of said shafts.

* * * * *

UNITED STATES PATENT AND TRADEMARK OFFICE
CERTIFICATE OF CORRECTION

PATENT NO. : 4,845,926
DATED : JULY 11, 1989
INVENTOR(S) : STEVEN D. DAVIS

It is certified that error appears in the above-identified patent and that said Letters Patent is hereby corrected as shown below:

Column 1, line 64, "hat" should be --heat--.
Column 6, line 43, "partically" should be --partially--.
Column 6, line 51, "partically" should be --partially--.
Column 6, line 52, "pouch" should be --pouches--.
Column 8, line 53, "shaft" should be --shafts--.
Column 8, line 67, "facilitate" should be --facilitates--.
Column 9, line 45, "154" should be --152--.
Column 11, line 6, "cylinder" should be --cylinders--.
Column 11, line 32, "optium" should be --optimum--.
Column 11, line 33, "for" should be --from--.
Column 11, line 34, "optium" should be --optimum--.
Column 11, line 56, insert --seal-- between "cross" and "is".
Column 12, line 2, delete the second occurrence of "would".
Column 12, line 45, insert --first-- between "said" and "output".
Column 12, line 46, "sad" should be --said--.

UNITED STATES PATENT AND TRADEMARK OFFICE
CERTIFICATE OF CORRECTION

PATENT NO. : 4,845,926

DATED : JULY 11, 1989

INVENTOR(S) : STEVEN D. DAVIS

It is certified that error appears in the above-identified patent and that said Letters Patent is hereby corrected as shown below:

Column 14, line 34, insert --moves-- between "means" and "said side".

Signed and Sealed this

Eleventh Day of December, 1990

Attest:

HARRY F. MANBECK, JR.

*Attesting Officer*  *Commissioner of Patents and Trademarks*